(12) United States Patent
Zimmel

(10) Patent No.: US 9,395,500 B2
(45) Date of Patent: Jul. 19, 2016

(54) OPTICAL FIBER CONNECTOR AND CABLE ASSEMBLY WITH DUAL DIAMETER CRIMP SLEEVE

(71) Applicant: ADC Telecommunications, Inc., Berwyn, PA (US)

(72) Inventor: Steven C. Zimmel, Minneapolis, MN (US)

(73) Assignee: CommScope Technologies LLC, Hickory, NC (US)

( * ) Notice: Subject to any disclaimer, the term of this patent is extended or adjusted under 35 U.S.C. 154(b) by 23 days.

(21) Appl. No.: 14/476,822

(22) Filed: Sep. 4, 2014

(65) Prior Publication Data

US 2015/0071592 A1    Mar. 12, 2015

Related U.S. Application Data

(60) Provisional application No. 61/874,567, filed on Sep. 6, 2013.

(51) Int. Cl.
  *G02B 6/36* (2006.01)
  *G02B 6/38* (2006.01)
  *B29L 11/00* (2006.01)

(52) U.S. Cl.
  CPC ....... *G02B 6/3889* (2013.01); *B29L 2011/0075* (2013.01); *G02B 6/3887* (2013.01)

(58) Field of Classification Search
  None
  See application file for complete search history.

(56) References Cited

U.S. PATENT DOCUMENTS

| 5,475,782 | A  |   | 12/1995 | Ziebol |   |
|---|---|---|---|---|---|
| 6,909,828 | B2 | * | 6/2005 | Zimmel | G02B 6/4476 385/100 |
| 7,035,510 | B2 | * | 4/2006 | Zimmel | G02B 6/4476 385/100 |
| 7,280,725 | B2 |   | 10/2007 | Brown et al. |   |
| 7,891,883 | B2 |   | 2/2011 | Zimmel et al. |   |
| 8,500,341 | B2 |   | 8/2013 | Zimmel et al. |   |
| 8,646,989 | B2 | * | 2/2014 | Zimmel | G02B 6/3885 385/81 |
| 8,905,650 | B2 | * | 12/2014 | Ishida | G02B 6/3887 385/77 |
| 2001/0038770 | A1 | * | 11/2001 | Nakajima | G02B 6/3887 403/275 |
| 2008/0310798 | A1 |   | 12/2008 | Cody et al. |   |
| 2014/0328560 | A1 | * | 11/2014 | Ahmed | G02B 6/4471 385/87 |

FOREIGN PATENT DOCUMENTS

EP    0 130 513 A2    1/1985
JP    2010-191420    9/2010

OTHER PUBLICATIONS

International Search Report and Written Opinion for Application No. PCT/US2014/053953 mailed Dec. 15, 2014.

* cited by examiner

*Primary Examiner* — Rhonda Peace
(74) *Attorney, Agent, or Firm* — Merchant & Gould P.C.

(57) ABSTRACT

Connectorizing an optical fiber cable includes mounting at least part of a connector housing about a ferrule assembly; positioning a crimp sleeve so that a distal section of the crimp sleeve is disposed about a proximal end of the connector housing and a proximal section of the crimp sleeve is disposed about a jacketed portion of the optical fiber cable; applying a first force to the distal section of the crimp sleeve to tighten the distal section of the crimp sleeve against the proximal end of the connector housing; and applying a second force to the proximal section of the crimp sleeve to tighten the proximal section of the crimp sleeve against the jacketed portion of the optical fiber cable. Adhesive may be added to the proximal section of the crimp sleeve through an aperture.

14 Claims, 8 Drawing Sheets

OPTICAL FIBER CONNECTOR AND CABLE ASSEMBLY WITH DUAL DIAMETER CRIMP SLEEVE

CROSS-REFERENCE TO RELATED APPLICATION(S)

This application claims the benefit of U.S. Provisional Application No. 61/874,567 filed on Sep. 6, 2013, and titled "Optical Fiber Connector and Cable Assembly with Dual Diameter Crimp Sleeve," the disclosure of which is hereby incorporated herein by reference.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A number of factors are important with respect to the design of a fiber optic connector. One such factor relates to the ability to effectively anchor a connector to a cable to prevent or minimize signal degradation resulting from a pulled cable.

SUMMARY

Aspects of this disclosure are directed to connectorizing an optical cable assembly with a connector having a crimp sleeve with a varying diameter and an adhesive aperture.

In accordance with some aspects of the disclosure, the crimp sleeve enables secure connection of cable strength members to a connector. In accordance with other aspects of the disclosure, one crimp sleeve can accommodate cables of various diameters.

In some implementations, connectorizing the optical fiber cable includes coupling a ferrule assembly to a first optical fiber of the optical fiber cable; mounting at least part of a connector housing about the ferrule assembly; positioning a crimp sleeve so that a distal section of the crimp sleeve is disposed about a proximal end of the connector housing and a proximal section of the crimp sleeve is disposed about a jacketed portion of the optical fiber cable; applying a first force to the distal section of the crimp sleeve to tighten the distal section of the crimp sleeve against the proximal end of the connector housing; applying a second force to the proximal section of the crimp sleeve to tighten the proximal section of the crimp sleeve against the jacketed portion of the optical fiber cable; and applying adhesive into an aperture defined in the proximal section of the crimp sleeve to enhance retention of the jacketed portion of the optical fiber cable within the proximal section of the crimp sleeve. The crimp at the proximal section controls the flow of adhesive to inhibit contact between the adhesive and the optical fiber of the cable.

In some implementations, an example optical cable and connector assembly includes an optical cable including at least a first optical fiber disposed within a cable jacket; a connector housing including a proximal housing and a distal housing that couple together; a ferrule assembly disposed in the connector housing; and a crimp sleeve. The crimp sleeve has a proximal section and a distal section. The distal section has a first internal cross-dimension and the proximal section has a second internal cross-dimension. The distal section of the crimp sleeve tightly crimps cable strength members to the proximal end of the proximal housing of the connector housing. The proximal section of the crimp sleeve is adhered to the cable jacket.

In certain implementations, the proximal section of the crimp sleeve is loosely crimped to the cable jacket. In certain implementations, the first internal cross-dimension is larger than the second internal cross-dimension.

In accordance with aspects of the disclosure, an example crimp sleeve includes a distal section including a first circumferential wall having a first internal cross-dimension; a proximal section including a second circumferential wall having a second internal cross-dimension; and a transition section including a third circumferential wall extending between the distal section and the proximal section. The second internal cross-dimension is smaller than the first internal cross-dimension. The third circumferential wall tapers between the first internal cross-dimension and the second internal cross-dimension. The first, second, and third circumferential walls cooperate to define an internal bore that extends along a longitudinal axis of the crimp sleeve. The second circumferential wall defines an aperture.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
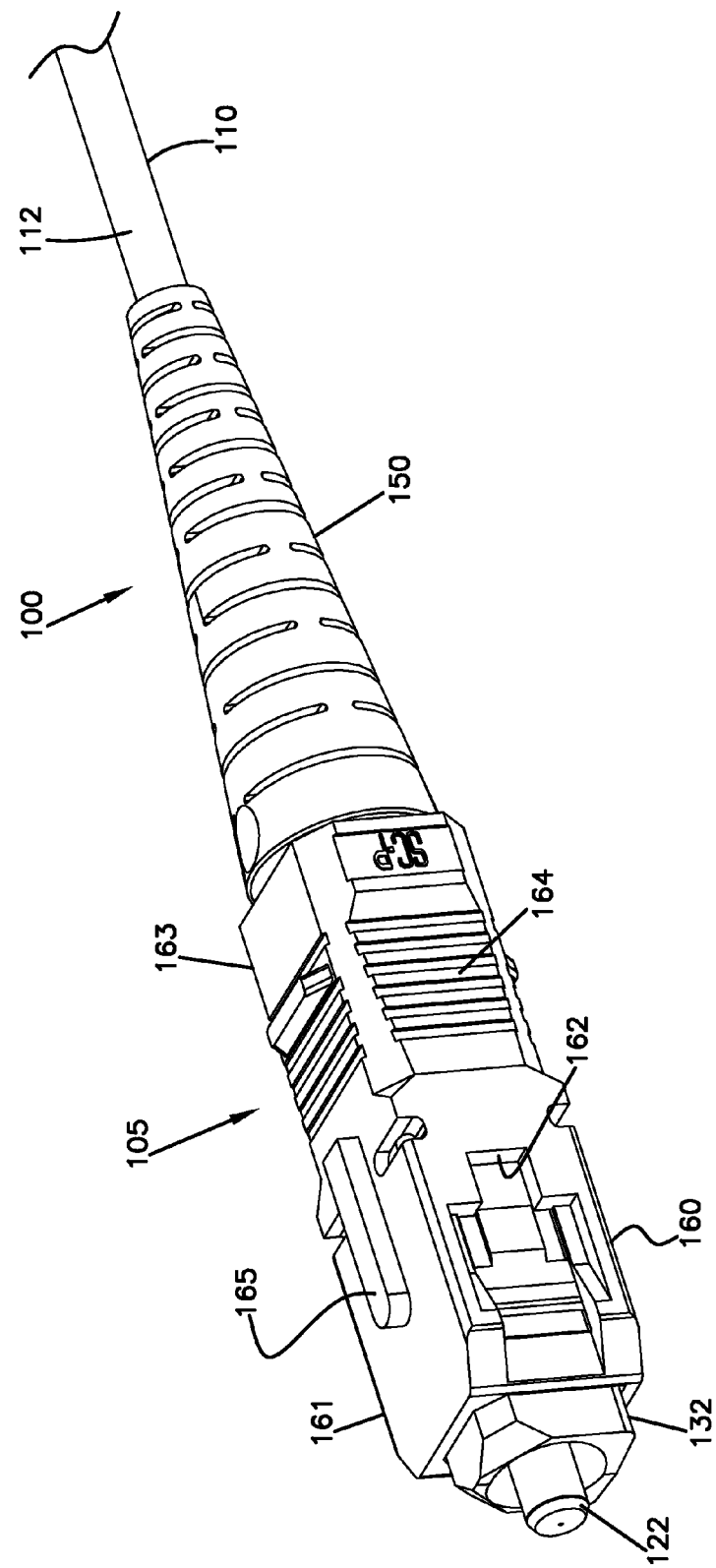
FIG. 1 is a perspective view of an example optical connector and cable assembly including an optical cable terminated by an optical connector in accordance with the principles of the present disclosure.

FIG. 1 illustrates one example optical connector and cable assembly 100 including an optical cable 110 terminated by an optical connector 105. In the example shown, the optical connector 105 is an SC connector. However, the principles of the present disclosure can be applied to other types of optical connectors (e.g., LC connectors, ST connectors, FC connectors, LX.5 connectors, etc.). In the example shown, the connector 105 terminates a single optical fiber 116. In other implementations, however, the connector can terminate a multi-fiber cable.

In accordance with some aspects of the disclosure, the same connector 105 can be applied to various cables having different transverse cross-dimensions (e.g., cable diameters). In an example, the optical connector 105 can terminate an optical fiber cable 110 having a transverse cross-dimension of two millimeters. In another example, the optical connector 105 can terminate an optical fiber cable 110 having a transverse cross-dimension of three millimeters.

Figure 2:
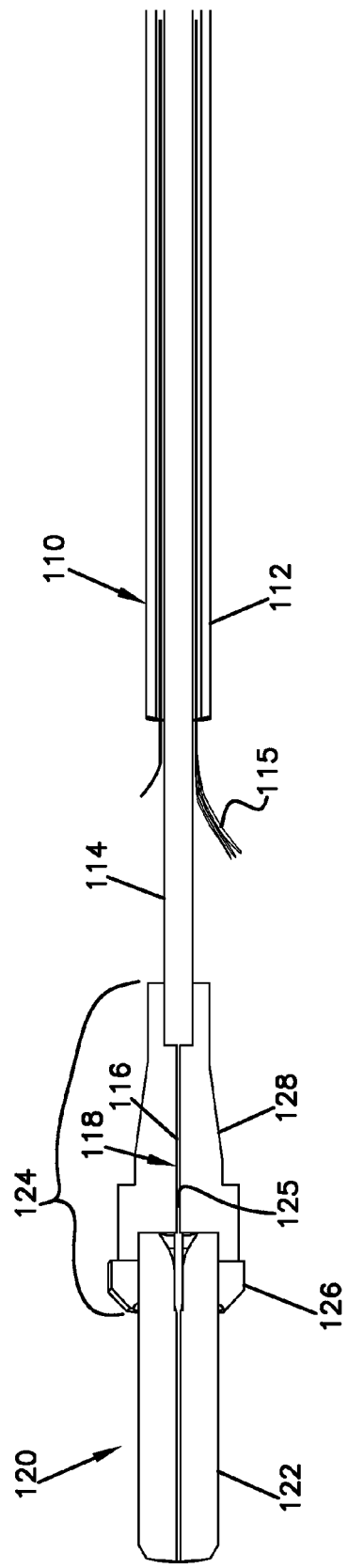
FIG. 2 is a cross-sectional view of an example cable assembly including a ferrule assembly terminating an optical fiber cable.

As shown in FIG. 2, the optical cable 110 includes an optical fiber 116 and strength members (e.g., aramid yarns) 115 surrounded by a cable jacket 112. In certain implementations, a buffer tube 114 is disposed between the optical fiber 116 and the strength members 115. The optical fiber 116 is coupled to a ferrule 122. In some implementations, a distal end of the optical fiber 116 is held by the ferrule 122. In other implementations, the distal end of the optical fiber 116 is spliced to a ferrule stub 124 of a ferrule assembly 120. In some such implementations, the ferrule assembly 120 includes a ferrule hub 124 disposed over the splice location 128. An example ferrule hub 124 can include a rear hub portion 128 overmolded to a flange 126. The ferrule hub 124 can be disposed about the buffer tube 114 of the cable 110 to protect the fiber 116.

Figure 3:
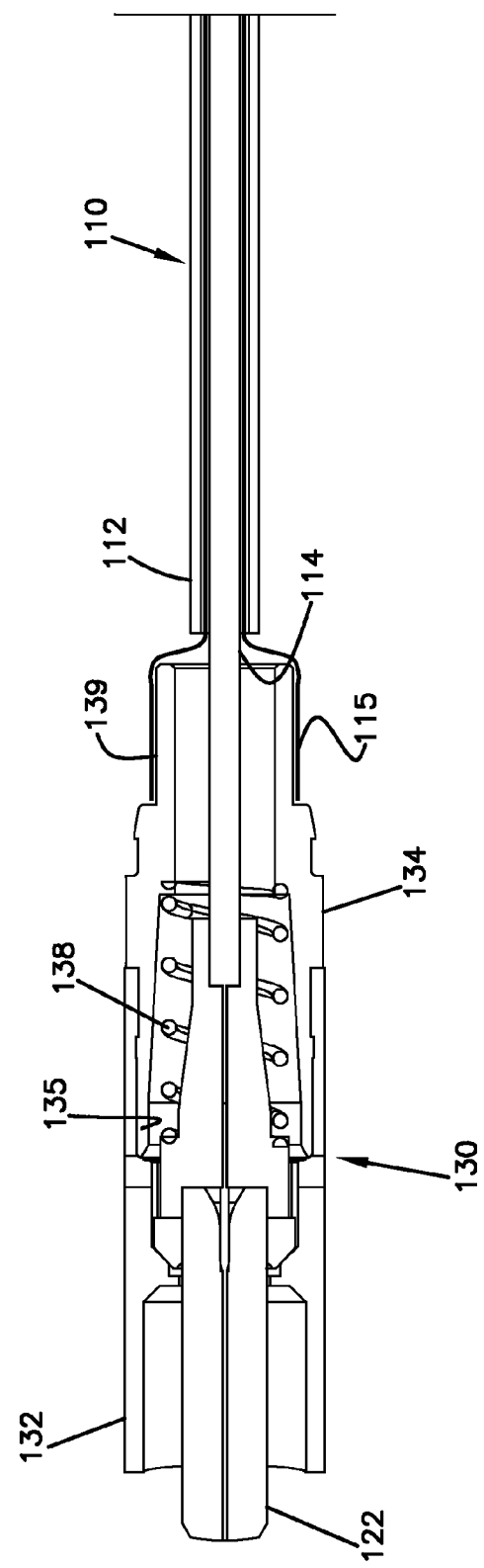
FIG. 3 is a cross-sectional view of an example connector housing mounted over the cable assembly of FIG. 2.

As shown in FIG. 3, a connector housing 130 can be assembled over the ferrule assembly 120. In the example shown, the connector housing 130 includes a distal housing 132 and a proximal housing 134. The distal and proximal housings 132, 134 cooperate to define a cavity 135 in which the ferrule assembly 120 and a spring 138 can be disposed. One end of the spring 138 abuts an inner surface of the proximal housing 134 and the other end of the spring 138 abuts the ferrule assembly 120 to bias the ferrule 122 outwardly from the distal housing 132.

Figure 4:
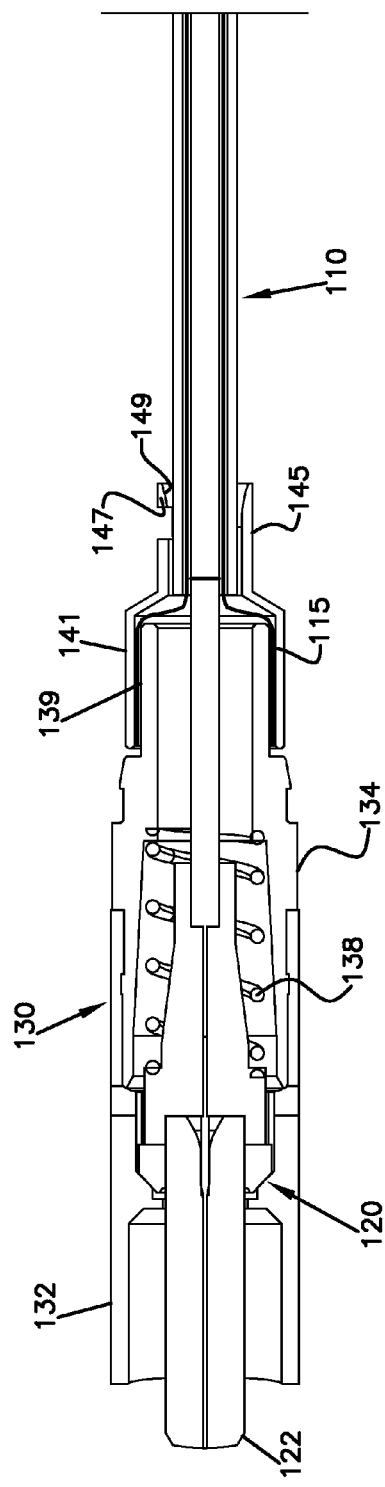
FIG. 4 is a cross-sectional view of an example crimp sleeve mounted over the connector housing and the cable assembly of FIG. 3.

As shown in FIG. 4, the connector housing 130 is secured to the cable 110 using a crimp sleeve 140. The crimp sleeve 140 includes a distal section 141 and a proximal section 145. The distal section 141 of the crimp sleeve 140 can be crimped over a proximal end 139 of the proximal housing 134 of the connector housing 130. The strength members 115 of the cable 110 can be retained between the crimp sleeve distal section 141 and the proximal connector housing 134. Crimping the strength members 115 to the connector housing 130 anchors the cable 110 to the connector housing 130.

In accordance with certain aspects of the disclosure, the proximal section 145 of the crimp sleeve 140 can be adhered to the cable jacket 112 of the cable 110. In certain implementations, the cable jacket 112 extends partially into the crimp sleeve 140. In the example shown, the cable jacket 112 terminates at a transition section 143 (FIG. 5) of the crimp sleeve 140. In other implementations, the cable jacket 112 can extend a greater or lesser distance into the crimp sleeve 140. Adhesive (e.g., a cyanoacrylate, an epoxy, a resin, etc.) can be added between the proximal section 145 of the crimp sleeve 140 and the cable jacket 112 to provide retention of the cable 110 at the crimp sleeve 140. The proximal section 145 of the crimp sleeve 140 defines an aperture 147 sized to receive an injection of adhesive.

In some implementations, the proximal section 145 of the crimp sleeve 140 can be crimped over the jacket 112 to manage the flow of the adhesive during injection. For example, the crimped proximal section 145 can inhibit the distal flow of adhesive towards the optical fiber 116. Accordingly, the crimped proximal section 145 can inhibit contact of the optical fiber 116 by the adhesive that would result in signal degradation. In certain implementations, the proximal section 145 is loosely crimped to the cable jacket.

The combination of the loose crimp and the adhesive allows the connector 115 to terminate cables 110 of different transverse cross-dimensions. The crimp sleeve proximal section 145 is tightened until the proximal section 145 bears against the cable jacket 112. Accordingly, the proximal section 145 would be squeezed a first amount to crimp over a first cable having a first cross-dimension and would be squeezed a second, different amount to crimp over a second cable having a second cross-dimension. The adhesive enables the crimp to be loose since the adhesive provides the necessary retention. The loose crimp inhibits crushing or otherwise damaging the optical fiber 116.

Figure 5:
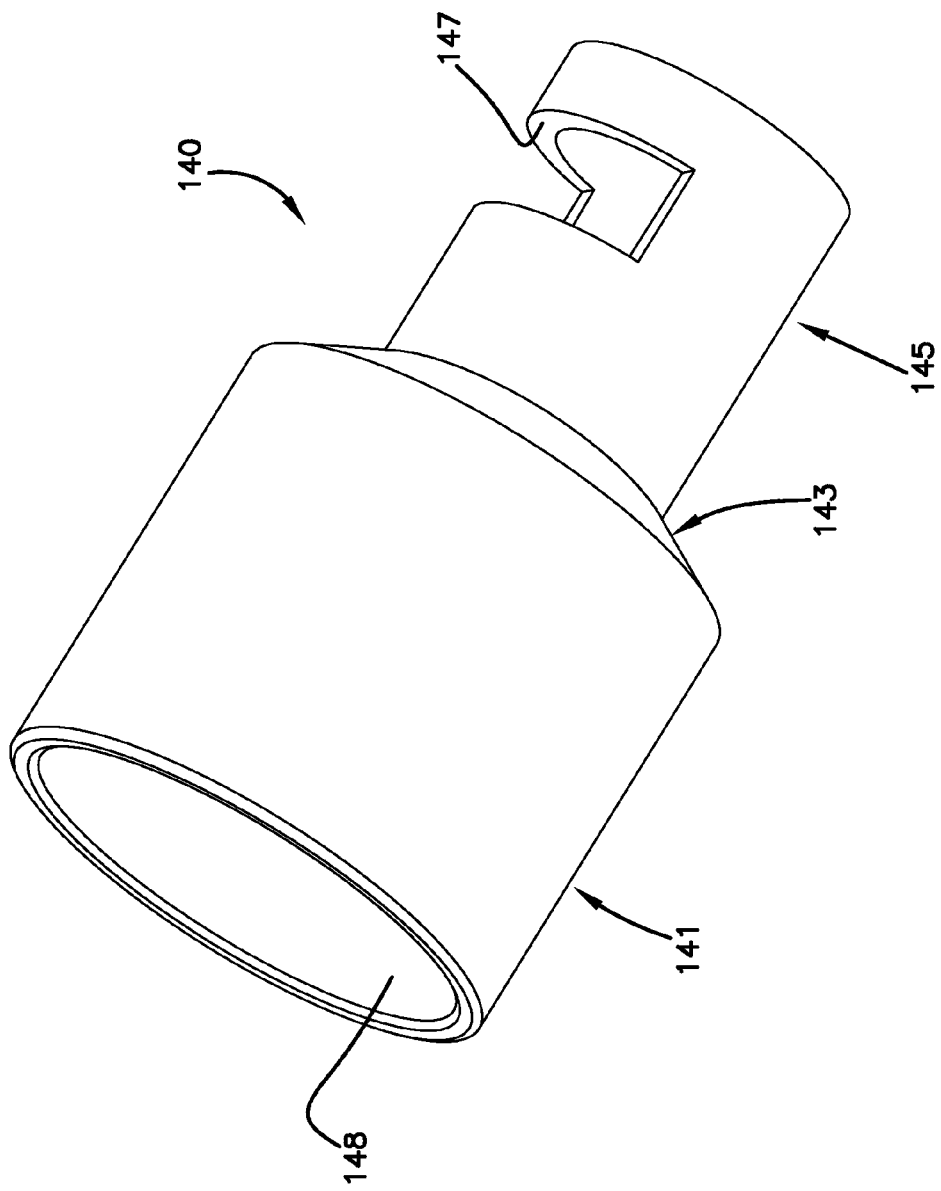
FIG. 5 is a perspective view of the example crimp sleeve of FIG. 4.
Figure 6:
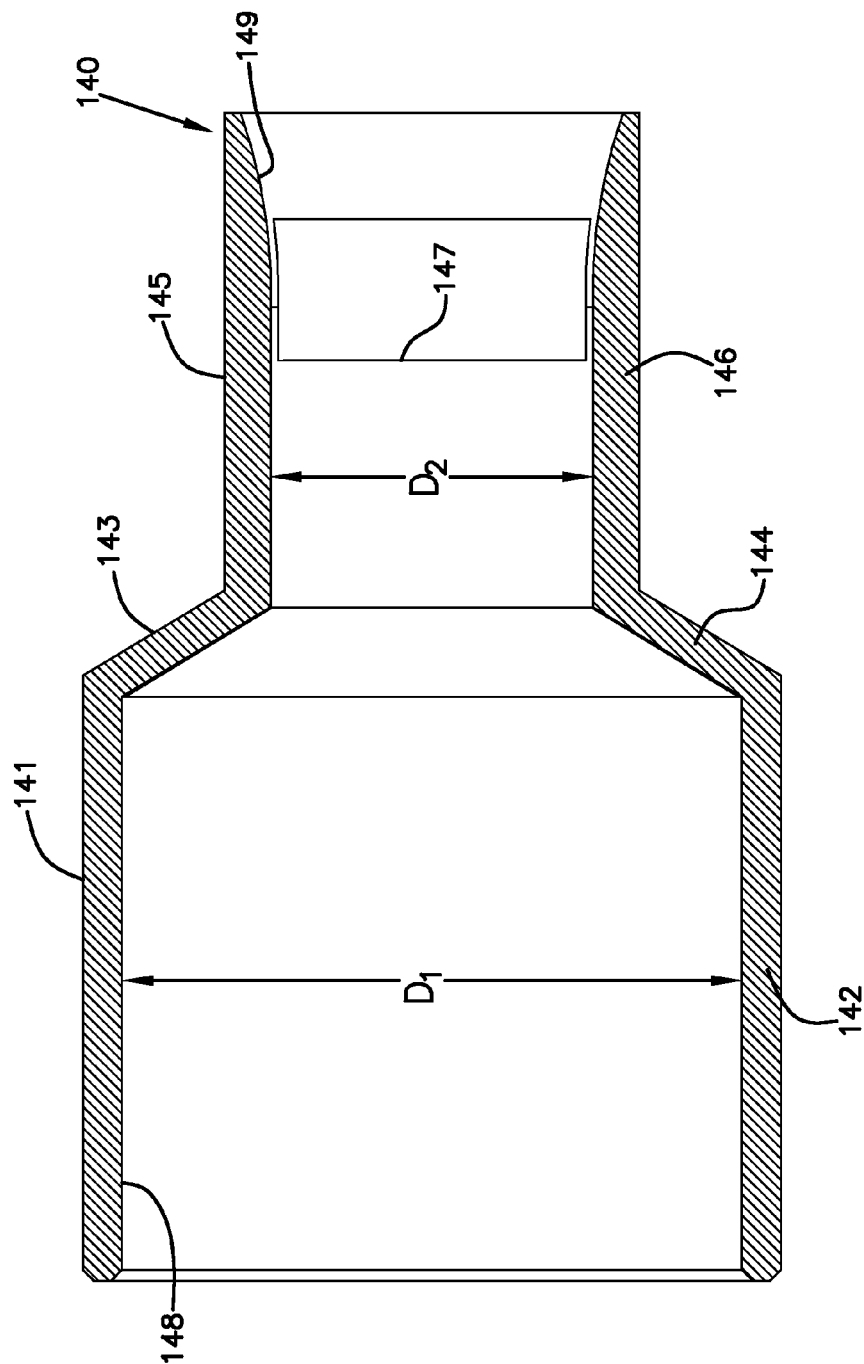
FIG. 6 is a longitudinal cross-section of the crimp sleeve of FIG. 5.

FIGS. 5 and 6 illustrate one example crimp sleeve 140 suitable for use in connecting the connector housing 130 to the cable 110. The distal section 141 of the crimp sleeve 140 includes a first circumferential wall 142 and the proximal section 145 of the crimp sleeve 140 includes a second circumferential wall 146. A transition section 143 includes a third circumferential wall 144 extending between the distal section 141 and the proximal section 145. The first, second, and third circumferential walls 142, 146, 144, respectively, cooperate to define an internal bore 148 that extends along a longitudinal axis of the crimp sleeve 140. As shown in FIG. 6, the bore 148 through the proximal crimp sleeve 140 tapers outwardly (i.e., the circumferential wall 146 becomes narrower). The tapered wall 146 facilitates threading the cable 110 through the crimp sleeve 140.

In accordance with some aspects of the disclosure, the crimp sleeve 140 is pre-formed as a dual-diameter crimp sleeve 140. For example, the first circumferential wall 142 has a first internal cross-dimension D1 and the second circumferential wall 146 has a second internal cross-dimension D2 when uncrimped. The third circumferential wall 144 tapers radially between the first and second walls 142, 146. In certain implementations, the second internal cross-dimension D2 is smaller than the first internal cross-dimension D1. In other implementations, the cross-dimensions D1, D2 are initially the same and vary during the crimping process.

The aperture 147 extends from an exterior of the crimp sleeve 140, through the circumferential wall 146 of the proximal section 145, to the bore 148. In some implementations, the aperture 147 extends along at least about 25% of a circumference of the proximal section 145 of the crimp sleeve 140. In certain implementations, the aperture 147 extends along about 33% of the circumference of the proximal section 145 of the crimp sleeve 140. In certain implementations, the aperture 147 extends along no more than about 50% of the circumference of the proximal section 145 of the crimp sleeve 140.

Figure 7:
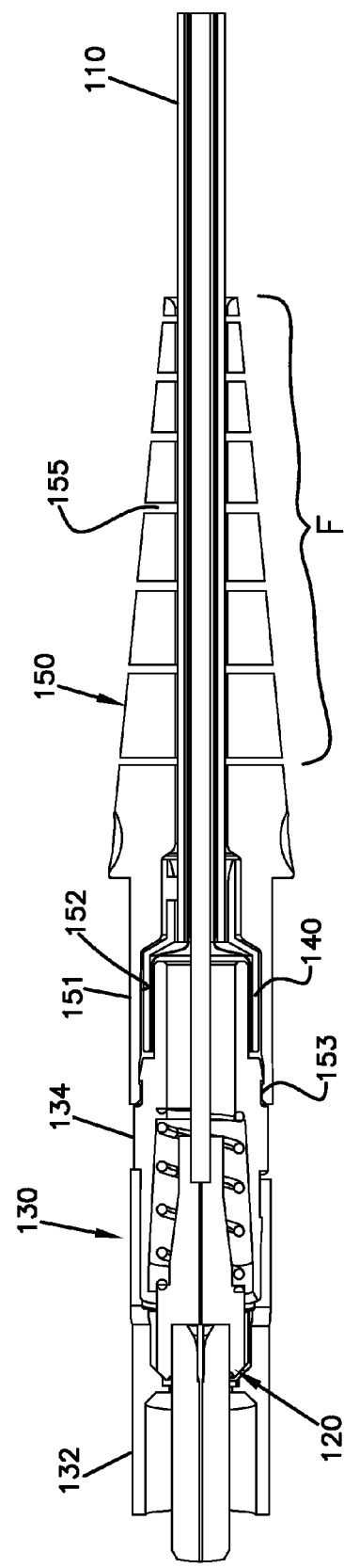
FIG. 7 is a cross-sectional view of an example strain-relief boot mounted over the crimp sleeve and connector housing of FIG. 4.

As shown in FIG. 7, a strain-relief boot 150 can be coupled to the connector housing 130 to provide strain-relief to the optical fiber 116 extending out of the proximal end of the connector housing 130. The boot 150 defines a passage 152 through which the optical cable 110 can pass. The boot 150 has a flexible section F that extends over a portion of the optical cable 110 to inhibit excessive bending of the cable portion. The flexible section F of the boot 150 defines slots, notches, or other structure to enhance flexing of the flexible section F relative to a remainder of the boot 150.

The boot 150 includes a retention section 151 that extends over the crimp sleeve 140. A distal end of the retention section 151 includes latching hooks 153 or other such structure that snap over retention structures on the proximal housing 134 to secure the boot 150 to the connector housing 130. The interior passage 152 of the boot 150 varies in size. The passage 152 has a relatively large cross-dimension around the distal section 141 of the crimp sleeve 140, a smaller cross-dimension around the proximal section 145 of the crimp sleeve 140, and an even smaller cross-dimension through the flexible section F.

Figure 8:
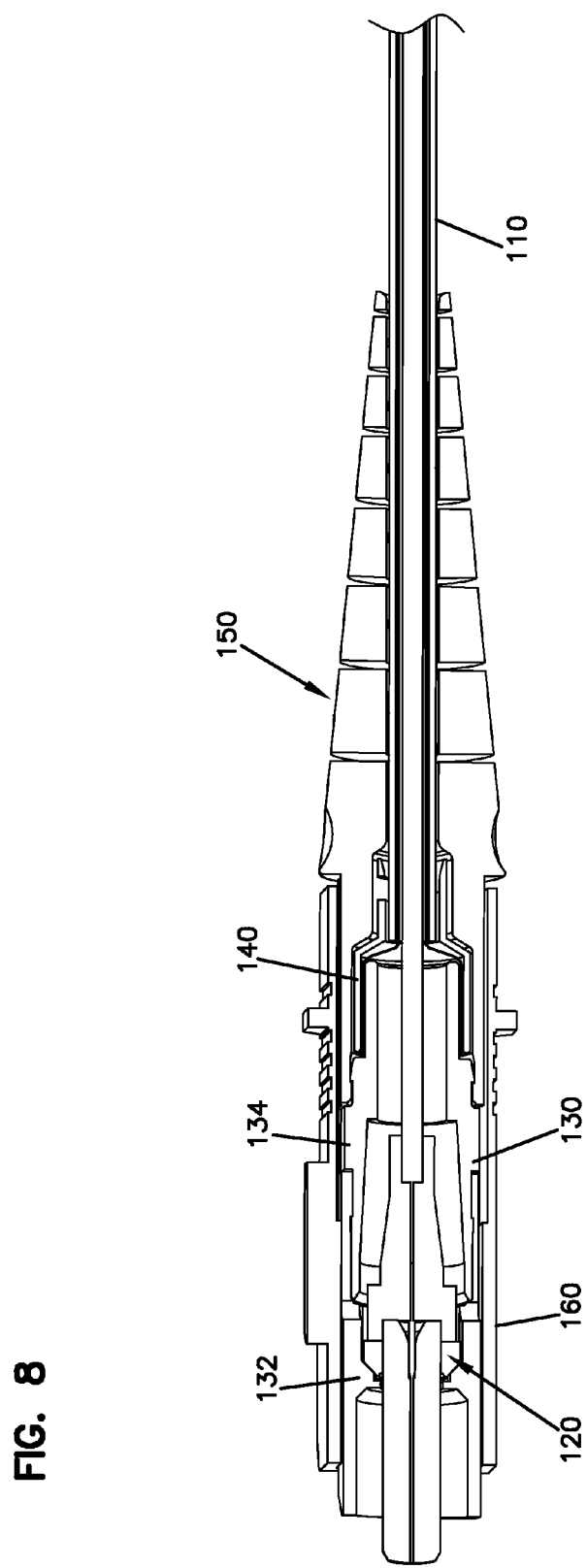
FIG. 8 is a cross-sectional view of an example release sleeve mounted over the connector housing and the cable assembly of FIG. 7.

As shown in FIG. 8, a release sleeve 160 can be mounted over the connector housing 130 to facilitate removal of the connector 105 from an optical adapter or other receptacle port. As shown in FIG. 1, the release sleeve 160 surrounds the connector housing 130 and part of the boot 150. A distal portion 161 of the release sleeve 160 defines openings 162 through which retention structure of the connector housing 130 is accessible. The proximal portion 163 of the release sleeve 160 provides a grip region 164. The release sleeve 160 also can include a key 165 to mate with a key slot in the optical adapter or other receptacle.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An optical connector and cable assembly comprising:
an optical cable including at least a first optical fiber and strength members disposed within a cable jacket;
a connector housing including a proximal housing portion and a distal housing portion that couple together, the proximal housing portion defining a proximal end of the connector housing and the distal housing portion defining a distal end of the connector housing;
a ferrule assembly disposed in the connector housing, the ferrule assembly including a ferrule and a ferrule spring, the ferrule having a distal end face that is accessible at the distal end of the connector housing, the ferrule holding the first optical fiber of the optical cable, the ferrule spring biasing the ferrule in a distal direction relative to the connector housing;
a crimp sleeve having a proximal section and a distal section, the distal section of the crimp sleeve being tightly crimped to the proximal end of the proximal housing portion of the connector housing to retain the strength members thereat, and the proximal section of the crimp sleeve being adhered and loosely crimped to the cable jacket, the proximal section of the crimp sleeve defining an aperture sized to receive an injection of adhesive; and
adhesive disposed at the proximal section of the crimp sleeve.

2. The optical connector and cable assembly of claim 1, wherein the aperture extends along at least about 25% of a circumference of the proximal section of the crimp sleeve.

3. The optical connector and cable assembly of claim 2, wherein the aperture extends along about 33% of the circumference of the proximal section of the crimp sleeve.

4. The optical connector and cable assembly of claim 3, wherein the aperture extends along no more than about 50% of the circumference of the proximal section of the crimp sleeve.

5. The optical connector and cable assembly of claim 1, wherein the distal section of the crimp sleeve has a first internal cross-dimension and the proximal section of the crimp sleeve has a second internal cross-dimension, the first internal cross-dimension being larger than the second internal cross-dimension.

6. The optical connector and cable assembly of claim 5, wherein the internal cross-dimension of the proximal section of the crimp sleeve tapers outwardly from the aperture to the proximal end of the connector housing.

7. The optical connector and cable assembly of claim 5, wherein the crimp sleeve also has a cross-dimension transition section disposed between the proximal section and the distal section, the transition section tapering between the proximal section and the distal section.

8. A method of connectorizing an optical fiber cable including a cable jacket surrounding at least a first optical fiber, the method comprising:
coupling a ferrule assembly to the first optical fiber of the optical fiber cable;
mounting at least part of a connector housing about the ferrule assembly;
positioning a crimp sleeve so that a distal section of the crimp sleeve is disposed about strength members that are disposed about a proximal end of the connector housing and a proximal section of the crimp sleeve is disposed about a jacketed portion of the optical fiber cable;
applying a first force to the distal section of the crimp sleeve to tighten the distal section of the crimp sleeve against the proximal end of the connector housing to retain the strength members thereat;
applying a second force to the proximal section of the crimp sleeve to tighten the proximal section of the crimp sleeve against the jacketed portion of the optical fiber cable, the second force being less than the first force; and
applying adhesive into an aperture defined in the proximal section of the crimp sleeve to enhance retention of the jacketed portion of the optical fiber cable within the proximal section of the crimp sleeve.

9. The method of claim 8, wherein applying adhesive into the aperture comprises injecting the adhesive using a syringe.

10. The method of claim 8, wherein the proximal section of the crimp sleeve is tightened before the adhesive is applied.

11. The method of claim 8, wherein the proximal section of the crimp sleeve is tightened to bear against the jacketed surface of the optical fiber cable.

12. The method of claim 8, further comprising pre-mounting the crimp sleeve and the at least part of the connector housing assembly on the optical fiber cable prior to coupling the ferrule assembly to the optical fiber cable.

13. The method of claim 8, further comprising positioning a strain-relief boot over the crimp sleeve and coupling the strain-relief boot to the connector housing.

14. The method of claim 8, wherein coupling the ferrule assembly to the first optical fiber comprises splicing a stub fiber of the ferrule assembly to the first optical fiber.

* * * * *